Sept. 29, 1936.  M. SURJANINOFF  2,055,595
WINDING FOR ELECTRIC MACHINES
Filed Dec. 6, 1934
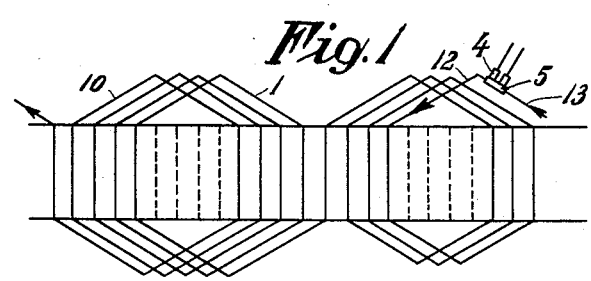
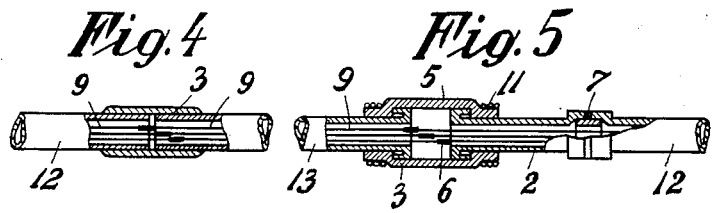
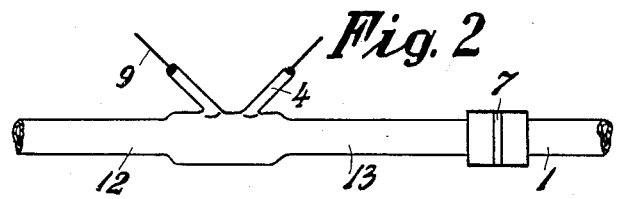
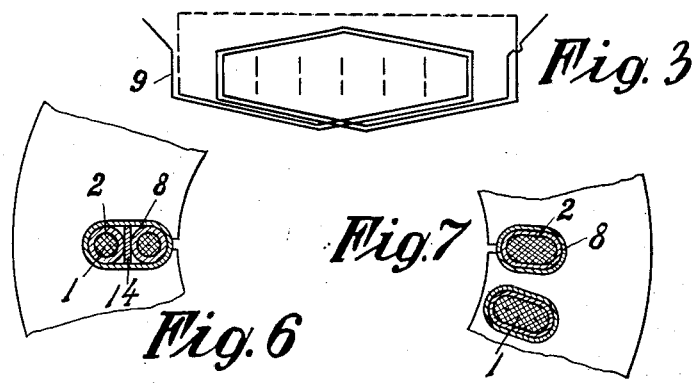
Inventor:—
Maria Surjaninoff
by E. F. Lundeatt
Atty.

Patented Sept. 29, 1936

2,055,595

UNITED STATES PATENT OFFICE 2,055,595

WINDING FOR ELECTRIC MACHINES

Maria Surjaninoff, Stammersdorf, Austria

Application December 6, 1934, Serial No. 756,335
In Austria December 9, 1933

9 Claims. (Cl. 171—206)

My invention relates to windings for electric machines and more particularly to a perfectly enclosed winding and to a method for making such windings.

Heretofore electric machines with perfectly enclosed windings had to be provided with a special iron structure or required a special and expensive plant for producing the protective coating.

It is the object of my invention to simplify and cheapen the manufacture of electric machines of the aforesaid class and with this object in view my invention consists essentially in making the winding of a cable or cables each comprising a plurality of insulated conductors, electrically insulated from each other the entirety of said conductors being enclosed by an insulating sheath, metal coated on its outside if desired. The said cables are wound into grooves of the iron core or structure, so that each groove encloses one or more cable layers and the conductors of said layers are electrically connected with each other in any desired series-parallel combination.

Further objects and features of my invention will be set forth later on reference being had to the annexed drawing in which Fig. 1 is a diagrammatic view of a two layer winding according to my invention. Fig. 2 is a side elevation of a part of the cable from which my improved winding is made. Fig. 3 illustrates the interconnection of individual conductors of the cable. Figs. 4 and 5 are longitudinal sections illustrating connection of adjacent ends of cables; Figs. 6 and 7 are transverse sections of an iron core provided with a two layer and a single layer winding according to my invention.

As shown in the drawing the windings of the iron structure or core of an electric machine such as an electric motor or generator or transformer or the like is built up of cables each comprising a plurality of conductors or wires insulated from each other, but electrically interconnected in any desired series parallel combination comprising also the case, that all the conductors constituting the winding are connected in parallel or that all of them are connected in series. Preferably the cables are located in grooves of the iron structure or core, either singly as shown in Fig. 7 or in pairs as shown in Fig. 6 or in sets of any desired number. In the drawing 1 is the cluster of insulated wires or conductors of the cable, 2 its insulating sheath enclosing the cluster 1. The winding may be built up of a single cable suitably wound in the grooves or of a plurality of cables, the cable or cables being wound in any desired manner, similarly as individual wires or conductors in ordinary electric machines, for instance as shown by way of example in Fig. 1. In any case the ends 12, 13, Figs. 2, 4 and 5 of the cable or cables are brought closely together. In case of polyphase winding preferably for each phase a separate cable is used passing through all the associated grooves of the core or iron structure. After winding the ends of the individual wires are interconnected in the desired manner preferably by soldering as indicated in Fig. 3, the soldered ends being subsequently insulated.

The ends of the cable or cables may then be covered by a fireproof or waterproof covering. For this purpose for instance a small tube 3 may be threaded on the cable ends or the sheath may be bent over. After interconnecting the conductors the tube 3 is pushed over the connected ends of the conductors thus protecting these ends and connecting water or fire proof the cable sheath ends.

The sheath of the cable may be made of rubber or the like. Such rubber sheath may first be made in a raw or half vulcanized state and may then, after applying thereto the aforesaid small tube 3 be fully vulcanized so that the wires or conductors are completely enclosed in a gas tight or water tight sheath. The folds or endangered parts for instance at sharp bends of the sheath are thus removed by subsequent heating or vulcanization. The connecting tubes 3, Fig. 4 or 5, Figs. 1 and 5 or the cable sheath itself may be provided with branching parts 4, Fig. 2 of rubber or the like for supply wires or the like. The connections 6 by soldering are staggered relatively to each other as completely as possible and carefully insulated.

The enclosing sheath may also be made of some suitable metal although the usual metallic sheath made in a single piece cannot be used in this case because in the small tubes heavy currents are set up by induction. In order to avoid this drawback the metallic sheath is provided with interposed insulating parts or the like preventing the setting up of induced currents. These interposed parts tightly connected with the sheath may be in the form of insulated rings or the like and may be readily made in manufacturing the cable.

Fig. 2 shows a constructional form in which the ends of the cable are connected watertight by means of a piece of rubber tube 5 provided with branches 4 for supply wires. The supply wires may also be provided with an enclosing sheath and may be introduced watertight into a terminal case or into a cable sleeve; they can also be connected directly to a cable.

The various parts of the sheath are separated from the walls of the grooves of the iron structure and from each other by interposed insulating sheets of hard card boards, tow and the like. For preventing the fusing together of parts of the cable during vulcanization the cable may be enclosed in a layer or hose 8 of tow.

It may happen that during winding the cable has to be sharply bent whereby the sheath might be damaged. To avoid this the various wires or conductors of the cable are stranded together whereby the inner tensions are counteracted. The wires or conductors of the cables may be insulated from each other in any suitable manner for instance by rubber which may be pressed around them, thus filling any interstices and preventing any injury to the wires.

Fig. 1 shows for the sake of simplicity only one branch of a three phase winding with staggered layers the direction of winding being indicated by arrows, but of course, any mode of winding may be made as already stated.

The electric machines provided with the hereinbefore winding and more particularly electric motors may be used in localities exposed to moisture and corroding or explosive gases and may even run under water for years.

The present cable may be readily manufactured and tested as to gas or water tightness before use. The present winding permits of a particularly safe construction of water-tight motors since the number of connecting points in the sheath, which always cause trouble, is reduced to a minimum.

The sheath may also be made of a fire proof material such as asbestos with a suitable agglomerant for instance water glass for obtaining a heat or fire resisting winding. This material may be introduced by suitable presses between the wires and also onto the outside of the cable in such a manner, that the cable has the necessary flexibility and pliability. The cable may also be coated with impregnated tow. After winding the connecting points of the cable ends may be coated with the same mass. The sheath of the cable may also be made of an artificial resin while in the soft state. The finished winding may be hardened by thermic or chemical treatment.

If a metal sheath is used it is preferably made of lead, and if a sheath of rubber, artificial resin or the like is used it may be covered or armoured with a metal, preferably with lead.

What I claim is:

1. A winding for electric machines having frames, comprising a continuous cable wound in said frame and including a plurality of insulated conductors the ends of which are electrically connected together at the abutting ends of said cable, a water-proof insulating sheath about said conductors, and a water-proof joint at the abutting ends of said cable.

2. A winding for electric machines having frames, comprising a continuous cable wound in said frame and including a plurality of insulated conductors the ends of which are electrically connected together at the abutting ends of said cable, a sheath about said conductors, formed of a material selected from the group of insulating and water-proof materials consisting of rubber, gutta-percha, and artificial resin, and a water-proof joint at the abutting ends of said cable.

3. A winding for electric machines having frames, comprising a continuous cable wound in said frames and including a plurality of insulated conductors the ends of which are electrically connected together at the abutting ends of said cable, a sheath of soft metal about said conductors and insulated therefrom, said sheath including interposed insulating parts, and a water-proof joint at the abutting ends of said cable.

4. A winding for electric machines having frames, comprising a continuous cable wound in said frame and including a plurality of insulated conductors the ends of which are electrically connected together at the abutting ends of said cable, a sheath of lead about said conductors and insulated therefrom, said sheath including interposed insulating parts, and a water-proof joint at the abutting ends of said cable.

5. A winding for electric machines having frames, comprising a continuous cable wound in said frame and including a plurality of insulated conductors the ends of which are electrically connected together at the abutting ends of said cable, a water-proof insulating sheath about said conductors, consisting of elastic material hardened in position, and a water-proof joint at the abutting ends of said cable.

6. A winding for electric machines having frames, comprising a continuous cable wound in said frame and including a plurality of insulated conductors the ends of which are electrically connected together at the abutting ends of said cable, a water-proof insulating sheath about said conductors, consisting of artificial resin hardened in position, and a water-proof joint at the abutting ends of said cable.

7. A winding for electric machines having frames, comprising a continuous cable wound in said frame and including a plurality of insulated conductors the ends of which are electrically connected together at the abutting ends of said cable, a water-proof sheath of gas-tight, insulating and elastic material about said conductors, the space within the sheath and between the conductors being filled with an insulating mass, and a water-proof joint at the abutting ends of said cable.

8. A winding for electric machines having frames, comprising a continuous cable wound in said frame and including a plurality of insulated conductors the ends of which are electrically connected together at the abutting ends of said cable, a water-proof and fire-proof sheath of gas-tight, elastic material about said conductors, a soft metal covering for said sheath, and a water-proof joint at the abutting ends of said cable.

9. A winding for electric machines having frames, comprising a continuous cable wound in said frame and including a plurality of insulated conductors the ends of which are electrically connected together at the abutting ends of said cable, and coverings of rubber sealing the abutting ends of said cable.

MARIA SURJANINOFF.